(12) United States Patent
Kurihara

(10) Patent No.: US 7,597,470 B2
(45) Date of Patent: Oct. 6, 2009

(54) ILLUMINATING DEVICE, AND DISPLAY DEVICE AND PORTABLE ELECTRONIC DEVICE HAVING THE SAME

(75) Inventor: Makoto Kurihara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/827,069

(22) Filed: Jul. 10, 2007

(65) Prior Publication Data

US 2008/0037282 A1   Feb. 14, 2008

(30) Foreign Application Priority Data

Aug. 9, 2006   (JP) .............................. 2006-217124

(51) Int. Cl.
*F21V 7/04* (2006.01)
(52) U.S. Cl. .................. 362/616; 362/607; 362/612
(58) Field of Classification Search .................. 362/84, 362/231, 602, 606, 607, 612, 618, 627, 628, 362/800; 257/98, 99, 100; 349/61, 65
See application file for complete search history.

(56) References Cited

U.S. PATENT DOCUMENTS

| | | | | |
|---|---|---|---|---|
| 6,981,791 B2 * | 1/2006 | Higashiyama | ............... | 349/61 |
| 7,345,319 B2 * | 3/2008 | Okada | .................. | 362/612 |
| 7,380,953 B2 * | 6/2008 | Onishi et al. | ................. | 349/61 |
| 2006/0109682 A1 * | 5/2006 | Ko et al. | ..................... | 362/607 |
| 2007/0053208 A1 * | 3/2007 | Justel et al. | ................. | 362/627 |
| 2008/0219025 A1 * | 9/2008 | Spitzer et al. | ............... | 362/612 |

\* cited by examiner

*Primary Examiner*—Y My Quach Lee
(74) *Attorney, Agent, or Firm*—Adams & Wilks

(57) ABSTRACT

A plurality of display portions are illuminated in different colors using a light source of a single type and a single light guide plate. A light source (220) has a light emitting element for emitting blue light, and a red fluorescent substance which is excited by blue light to generate red light, thereby emitting violet light (L1) as a whole. The violet light (L1) enters a side surface of a light guide plate (210) and is emitted from an upper surface (211) and a lower surface (212) as violet light (L1-1) and (L1-2), respectively. A green fluorescent substance is provided in a fluorescent film (230). The light (L2) obtained after the violet light (L1-1) passes through the fluorescent film (230), becomes white light because green color component light generated from the fluorescent substance is mixed with the violet light (L1-1). On the other hand, on a lower surface side, the violet light L1-2 is used as illuminating light.

15 Claims, 6 Drawing Sheets

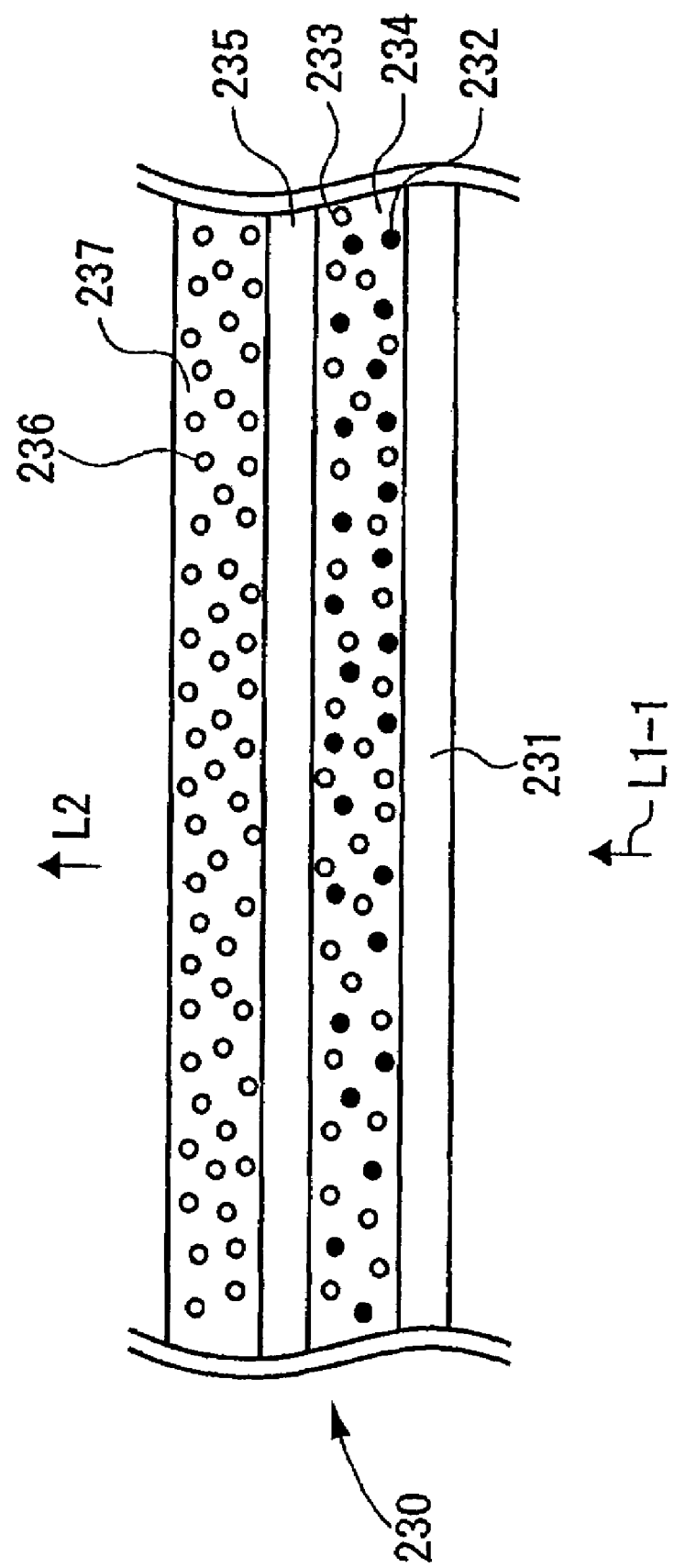

FIG.4

| | Fluorescent Substrate Added to Sealing Material | Fluorescent Substrate Material |
|---|---|---|
| Blue LED Element | Yellow Fluorescent Substrate | $(Y,Gd)_3Al_5O_{12}:Ce$ |
| | | $Tb_3Al_5O_{12}:Ce$ |
| | | $CaGa_2S_4:Eu$ |
| | | $Sr_2SiO_4:Eu$ |
| | | $Ca_x(Si,Al)_{12}(O,N)_{16}:Eu$ |
| | Red Fluorescent Substrate | $(Sr,Ca)S:Eu$ |
| | | $(Ca,Sr)_2Si_5N_8:Eu$ |
| | | $CaSiN_2:Eu$ |
| | | $CaAlSiN_3:Eu$ |
| | Green Fluorescent Substrate | $Y_3(Al,Ga)_5O_{12}:Ce$ |
| | | $SrGa_2S_4:Eu$ |
| | | $Ca_3Sc_2Si_3O_{12}:Ce$ |
| | | $Sr-SiON:Eu$ |
| Blue LED Element | Red Fluorescent Substrate | $Y_2O_2S:Eu$ |
| | | $La_2O_2S:Eu$ |
| | | $LiW_2O_8:Eu,Sm$ |
| | | $(Sr,Ca,Ba,Mg)_{10}(PO_4)_6Cl_2:Eu,Mn$ |
| | | $Ba_3MgSi_2O_8:Eu,Mn$ |
| | Green Fluorescent Substrate | $ZnS:Cu,Al$ |
| | | $BaMgAl_{10}O_{17}:Eu,Mn$ |
| | | $SrAl_2O_4:Eu$ |
| | Blue Fluorescent | $(Sr,Ca,Ba,Mg)_{10}(PO_4)_6Cl_2:Eu$ |
| | | $(Ba,Sr)MgAl_{10}O_{17}:Eu$ |
| | | $(Sr,Ba)_3MgSi_2O_8:Eu$ |

FIG. 5A
FIG. 5B
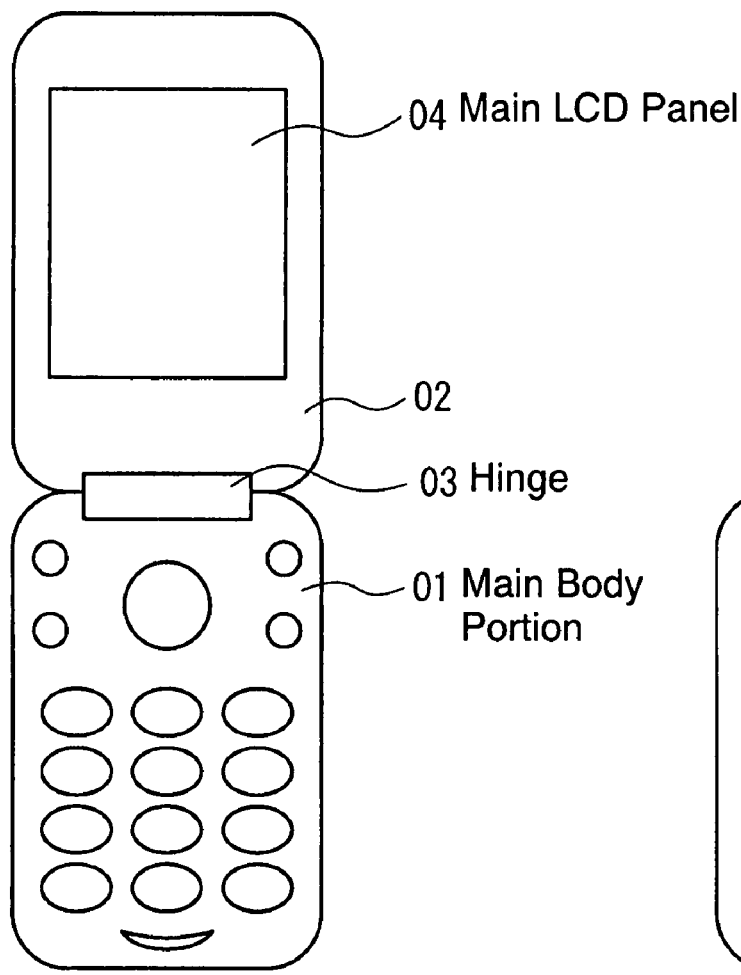
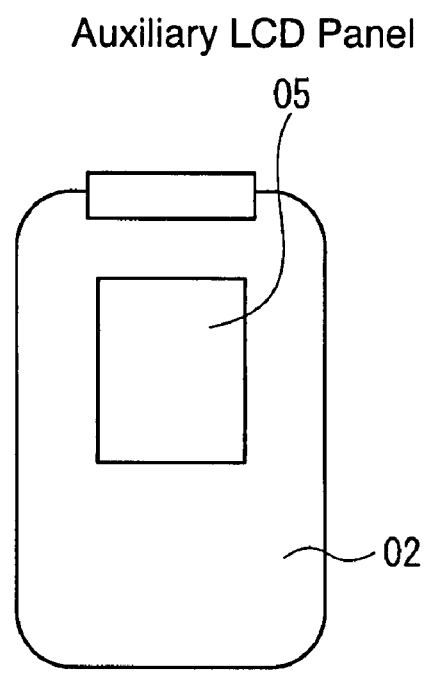

ILLUMINATING DEVICE, AND DISPLAY DEVICE AND PORTABLE ELECTRONIC DEVICE HAVING THE SAME

BACKGROUND OF THE INVENTION

1. Field of the Invention

The present invention relates to a display device having a plurality of display portions.

2. Description of the Related Art

A liquid crystal display device is widely used as a display device for various kinds of electronic devices such as a cellular phone, a computer, a personal digital assistant, and a video game. Liquid crystal display devices include reflective ones, transmissive ones, and transflective ones. As a display device for a portable electronic device such as a cellular phone described in the above, a transmissive liquid crystal display device and a transflective liquid crystal display device are widely used. Because a liquid crystal display panel is a non self light emitting type display element, an illuminating device (backlight) is necessary for a transmissive or transflective liquid crystal display device.

Cellular phones include so-called folder type (flip type) ones. FIG. 5 schematically illustrates a folder type cellular phone. FIG. 5A illustrates the cellular phone in an opened state while FIG. 5B illustrates the cellular phone in a folded state. As illustrated in FIGS. 5A and 5B, in this type of a cellular phone, a main body portion 01 having a plurality of buttons disposed thereon and a display portion 02 are connected by a hinge 03 so that the display portion 02 is opened and closed with respect to the main body portion 01. The display portion 02 has a main liquid crystal display panel 04 disposed on an inner side when folded and an auxiliary liquid crystal display panel 05 disposed on an outer side when folded. Specifically, in the display portion 02, the main liquid crystal display panel 04 and the auxiliary liquid crystal display panel 05 are disposed back to back. In order to illuminate the main liquid crystal display panel 04 and the auxiliary liquid crystal display panel 05 from respective sides of the back surfaces thereof, a main illuminating device and an auxiliary illuminating device are provided in some cases.

When the main and auxiliary liquid crystal display panels are thus illuminated by separate illuminating devices, because two illuminating devices are necessary, costs and the number of parts are increased, which raises problems of increased weight and increased size. Therefore, products in which the main and auxiliary liquid crystal display panels are illuminated by one illuminating device for reduction in thickness are widely provided. In such a product, a light guide plate is disposed between the main liquid crystal display panel and the auxiliary liquid crystal display panel. A light emitting diode emits light to a side surface of the light guide plate. The incident light is emitted from a light emitting surface on an upper surface side of the light guide plate (surface on the side of the main liquid crystal display panel) and from a light emitting surface on a lower surface side of the light guide plate (surface on the side of the auxiliary liquid crystal display panel) to illuminate the main and auxiliary liquid crystal display panels. In this case, in order to make larger an amount of light illuminating the large main liquid crystal display panel than an amount of light illuminating the small auxiliary liquid crystal display panel, a transflective sheet which partly transmits light and partly reflects light is disposed between the light guide plate and the auxiliary liquid crystal display panel in some cases (see, for example, JP 2004-87409 A).

In the structure in which the main and auxiliary liquid crystal display panels are illuminated by using one illuminating device, because light is emitted from both surfaces of one light guide plate, the color of the backlight of the main liquid crystal display panel and the color of the backlight of the auxiliary liquid crystal display panel are the same. Normally, the color of the backlight (that is, the color of light emitted from the illuminating device) is white. This is because a color liquid crystal display panel can perform optimum color display by being illuminated by white backlight.

However, while a color liquid crystal display panel is used as the main liquid crystal display panel, a monochrome liquid crystal display panel is used as the auxiliary liquid crystal display panel in some cases. In such a case, the auxiliary liquid crystal display panel can naturally perform only monochrome display and can not perform chromatic display. If, although various colors are applied to the main body portion and a case of the display portion of a cellular phone, the auxiliary liquid crystal display panel only performs monochrome display and can not perform chromatic display, such a cellular phone is less attractive as a product. In order to enhance the appearance of the cellular phone as a product (from the viewpoint of design), it is effective that the monochrome liquid crystal display panel is chromatically colored even if only in one color.

SUMMARY OF THE INVENTION

Accordingly, an object of the present invention is to provide a double-sided display device capable of chromatic display using a monochrome liquid crystal display panel in an electronic device for illuminating a main color liquid crystal display panel and an auxiliary monochrome liquid crystal display panel by one illuminating device.

In order to solve the above-mentioned problems, according to an aspect of the present invention, there is provided an illuminating device including: a light source for generating light including a wavelength which excites a fluorescent substance; a light guide plate having a first light emitting surface and a second light emitting surface for emitting light when light generated from the light source enters an incidence surface thereof; and a whitening film disposed in a path of light emitted from the first light emitting surface and including a fluorescent substance for emitting light having a color component for generating white light by being mixed with light generated from the light source.

According to another aspect of the present invention, an illuminating device uses a light source formed by sealing within a transparent sealing resin, an LED element for emitting light including a wavelength which excites a fluorescent substance. The illuminating device includes a light guide plate formed of a transparent resin in the shape of a plate for emitting light from a first light emitting surface which is an upper surface and from a second light emitting surface which is a lower surface when light emitted from the light source enters a side surface thereof, and a whitening film disposed at a position where light emitted from the first light emitting surface passes and including the fluorescent substance for emitting light having a color component which makes light passing therethrough into white light by being mixed with the light emitted from a light emitting diode.

According to still another aspect of this invention, an illuminating device includes: a light source formed by sealing within a transparent sealing resin with a fluorescent substance added thereto a light emitting element for emitting light including a wavelength which can excite the fluorescent substance; a light guide plate formed of a transparent resin in a shape of a plate for emitting light from a first light emitting surface which is an upper surface and from a second light emitting surface which is a lower surface when light emitted from the light source enters a side surface thereof; and a whitening film disposed at a position where light emitted from the first light emitting surface passes and including a fluorescent substance for emitting light having a color component which makes light passing therethrough white light by mixing the light with light emitted from a light emitting diode. Further, the whitening film has a fluorescent substance dispersion layer where the fluorescent substance and transparent beads are dispersed and mixed. The illuminating device further includes at a position where light emitted from the second light emitting surface a filter having a layer in which a pigment or a fluorescent substance is dispersed, or a specific color light cutting filter for cutting a specific color component of light. Further, as the light emitting element, an LED for emitting blue light having a peak wavelength of 450 to 470 nm or an LED for emitting near-ultraviolet light is used.

According to yet another aspect of the present invention, a display device is structured such that the main color liquid crystal display panel and the auxiliary monochrome liquid crystal display panel are disposed back to back with a space therebetween, and a double-sided illuminating device is disposed between the main liquid crystal display panel and the auxiliary liquid crystal display panel with the first light emitting surface facing a back surface of the main liquid crystal display panel and the second light emitting surface facing a back surface of the auxiliary liquid crystal display panel. Such a double-sided display device can be incorporated into a display portion of a folder type portable electronic device.

BRIEF DESCRIPTION OF THE DRAWINGS

In the accompanying drawings:

FIG. 3 is an enlarged sectional view illustrating a fluorescent film (whitening film);

FIG. 4 is a table illustrating exemplary combinations of a light emitting element (LED element) and a fluorescent substance added to a sealing material;

FIGS. 5A and 5B are schematic views each illustrating a general folder-type cellular phone;

DETAILED DESCRIPTION OF THE PREFERRED EMBODIMENTS

Figure 1:
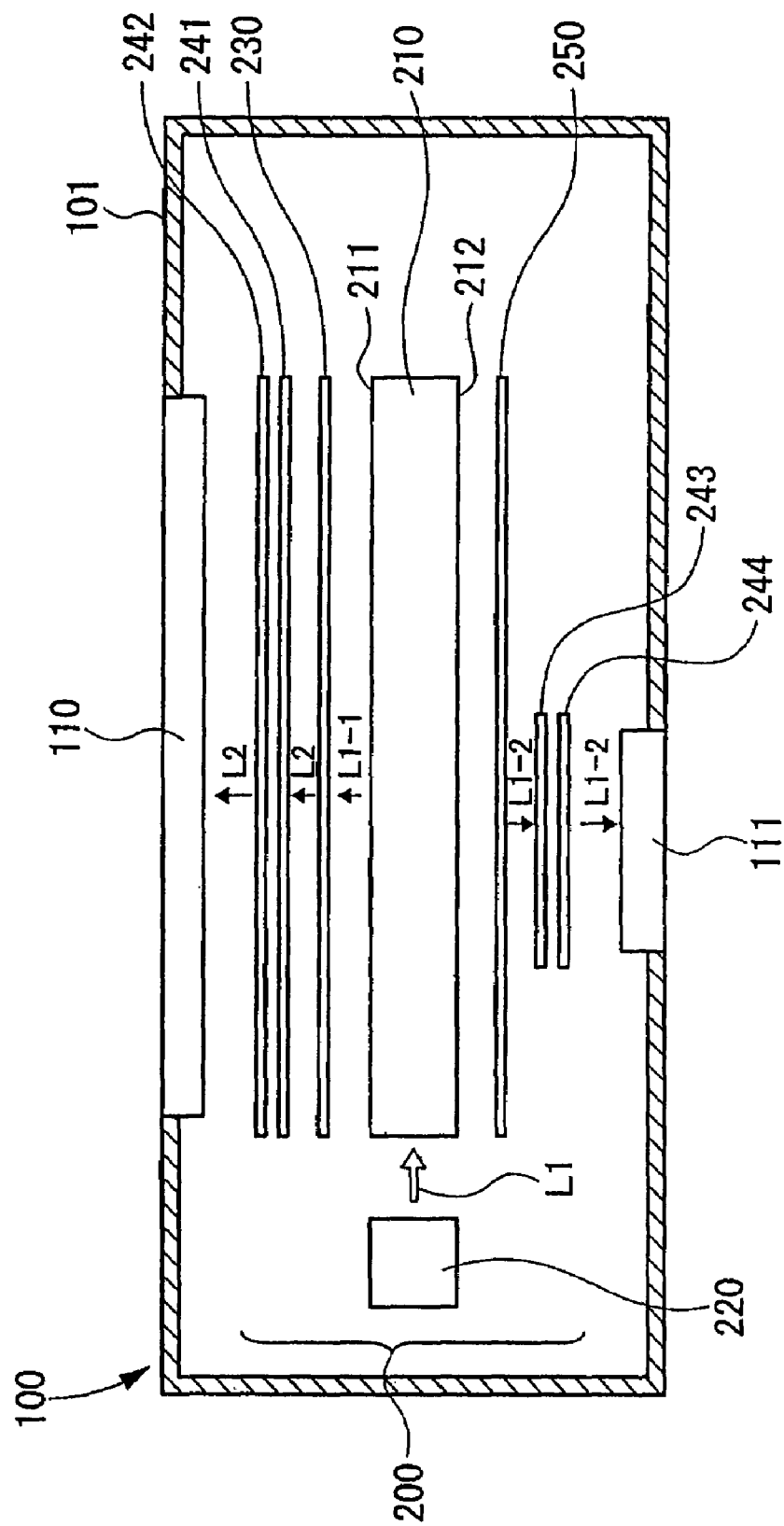
FIG. 1 is a sectional view of a display portion of a cellular phone according to the present invention.

An illuminating device according to the present invention includes: a light source for generating light including a wavelength which excites a fluorescent substance; a light guide plate having a first light emitting surface and a second light emitting surface for emitting light when light generated from the light source enters an incidence surface; and a whitening film disposed in a path of light emitted from the first light emitting surface and including a fluorescent substance for generating light having a color component which becomes white light by being mixed with light emitted from the light source. The structure makes it possible to illuminate a side of the first light emitting surface in white and to illuminate a side of the second light emitting surface with another color by using a light source of a single type and a single light guide plate.

In this case, the light source includes a light emitting element for emitting light including a wavelength which excites a fluorescent substance, and a transparent resin added with the fluorescent substance for emitting light including another wavelength by being excited by the light emitted by the light emitting element.

Further, the whitening film has a fluorescent substance dispersion layer in which the fluorescent substance and transparent beads are dispersed and mixed. Therefore, part of light from the light source passes through the transparent beads without fail, and thus, the ratio of light which passes through the whitening film without changing the color of light from the light source becomes higher. Therefore, the brightness is improved, and the color of light which passes through the whitening film becomes white without fail.

A display device according to the present invention includes: a first display portion; a second display portion; a light source; and a light guide plate having an incidence surface that light from the light source enters, a first light emitting surface for emitting light for illuminating the first display portion, and a second light emitting surface for emitting light for illuminating the second display portion. Light conversion means which is excited by a wavelength component of light from the light source to emit light is provided between the first display portion and the first light emitting surface. This makes it possible to illuminate the first display portion and the second display portion in differently colored light. Specifically, a plurality of display portions can be illuminated in different colors using a light source of a single type and a single light guide plate. In this case, the light source includes a light emitting element for emitting light including a wavelength which excites a fluorescent substance, and a transparent resin added with the fluorescent substance for emitting light including another wavelength by being excited by the light emitted by the light emitting element.

In this case, employed is the structure in which the first display portion is provided in a color liquid crystal display element having a color filter, the second display portion is provided in a liquid crystal display element for performing monochrome display, and the light conversion means can illuminate the color liquid crystal display element with white light generated by converting light from the light source. As a result, it is possible to illuminate the color liquid crystal display element for performing display of high color reproducibility and to illuminate the liquid crystal display panel for performing monochrome display in colored light by using a light source of a single type and a single light guide plate. In this case, the light conversion means includes a color fluorescent substance for emitting light having a color component different from that of light from the light source by being excited by light from the light source, and white light is generated by mixing light from the light source with light having a color component different from that of light from the light source.

Further, a filter having a layer in which a pigment or a fluorescent substance is dispersed or a particular color light cutting filter for cutting a particular color component among color components of light emitted from the light source is provided between the second light emitting surface and the second display portion. The structure makes it possible to illuminate the second display portion in an arbitrary color independently of the color of light emitted from the light source. For example, in order to obtain white light most suitable for a liquid crystal display device using a color filter, there may be only limited combinations of the light source and the light conversion means. Even in such a case, by providing the above-mentioned filter between the second light emitting surface and the second display portion, the second display portion can be illuminated in a color different from that of the light source.

According to the present invention, a plurality of colors of illuminating light can be obtained using a light source of a single type and a single light guide plate. Therefore, a plurality of display portions can be illuminated in different colors using a light source of a single type and a single light guide plate.

Embodiments of the present invention are now described in detail in the following with reference to the attached drawings.

Embodiment 1

FIG. 1 is a sectional view schematically illustrating a double-sided display device according to Embodiment 1. As illustrated in FIG. 1, a main color liquid crystal display panel 110 is disposed on one side of a case 101 of a double-sided display device 100 while an auxiliary monochrome liquid crystal display panel 111 is disposed on the other side of the case 101. Specifically, the main liquid crystal display panel 110 and the auxiliary liquid crystal display panel 111 are disposed back to back with a space therebetween. In this case, the auxiliary liquid crystal display panel 111 has an area smaller than that of the main liquid crystal display panel 110. A planar double-sided illuminating device 200 is provided between the liquid crystal display panels 110 and 111.

A light guide plate 210 of the double-sided illuminating device 200 is a rectangular plate-like member formed of a transparent resin such as an acrylic resin or a polycarbonate. An upper surface (first light emitting surface) 211 of the light guide plate 210 faces a back surface of the main liquid crystal display panel 110 while a lower surface (second light emitting surface) 212 of the light guide plate 210 faces a back surface of the auxiliary liquid crystal display panel 111. Further, the area of the upper surface 211 and the area of the lower surface 212 of the light guide plate 210 are substantially the same as that of a display surface of the main liquid crystal display panel 110.

Figure 2:
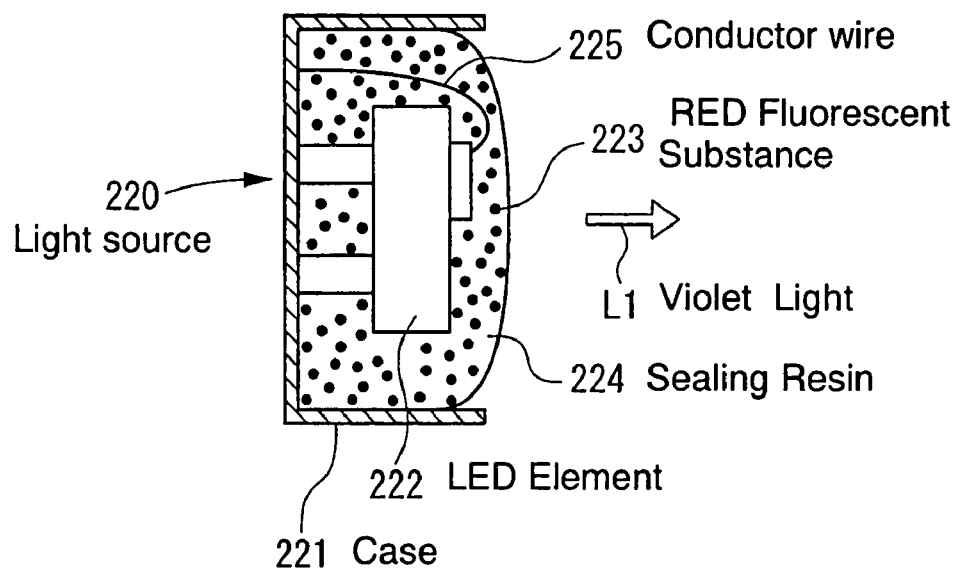
FIG. 2 is a schematic sectional view illustrating a structure of a light source using an LED element.

A light source 220 having an LED element packaged therein is used in the double-sided illuminating device 200. The light source 220 is disposed so as to face a side surface of the light guide plate 210. FIG. 2 illustrates a detailed structure of the light source 220. As illustrated in FIG. 2, the light source 220 according to this embodiment is formed by sealing an LED element 222 disposed in a case 221 within a transparent sealing resin 224 such as a silicone resin or an epoxy resin with a red fluorescent substance 223 added thereto. It should be noted that a conductor wire 225 is provided for driving the LED element 222.

The LED element 222 is an InGaN-based or GaN-based light emitting element and emits blue light (light having a peak wavelength of 450 to 470 nm). The red fluorescent substance 223 is a fluorescent substance for emitting red light. Specifically, an europium-doped sulfide such as CaS:Eu or SrS:Eu, a nitride based fluorescent substance such as $CaAlSiN_3$:Eu, or an organic colored resin fine powder is adopted. The red fluorescent substance 223 using such a material is, when blue light is emitted from the LED element 222, excited by the blue light, and emits red light (fluorescent light). In this way, in the light source 220, the LED element 222 emits blue light and the red fluorescent substance 223 emits red light, so the light source 220 as a whole emits violet light L1.

With reference to FIG. 1 again, the violet light L1 emitted from the light source 220 enters the side surface of the light guide plate 210, passes through the light guide plate 210, and is emitted or exits from the upper surface 211 and the lower surface 212 which are light-emitting surfaces. A light conversion element in the form of a fluorescent film (whitening film) 230 is disposed between the upper surface 211 of the light guide plate 210 and the main liquid crystal display panel 110. Further, two prism sheets 241 and 242 for improving the brightness are disposed between the fluorescent film 230 and the main liquid crystal display panel 110.

The fluorescent film 230 is a whitening film (light wavelength conversion film) which has the function of making the color of light L2 which passes through and out of the film white by transmitting the violet light L1-1 emitted from the upper surface 211 of the light guide plate 210. A specific example of the fluorescent film (whitening film) 230 is illustrated in FIG. 3. As illustrated in the figure, the fluorescent film 230 is formed by printing a transparent resin (fluorescent substance dispersion layer) 234 such as an acrylic resin on an upper surface of a PET (polyethylene terephthalate) film 231, disposing a PET film 235 on an upper surface of the transparent resin 234, and further, printing a transparent resin 237 such as an acrylic resin in which transparent beads 236 are dispersed and mixed on an upper surface of the PET film 235.

In addition, a green fluorescent substance 232 and transparent beads 233 are dispersed and mixed in the transparent resin (fluorescent substance dispersion layer) 234. The green fluorescent substance 232 is, for example, $SrGa_2S_4$:Eu, $CaSrGa_2S_4$:Eu, or an organic colored resin fine powder, and emits green light when blue color component light is irradiated. The light L2 emitted from the fluorescent film 230 is white light because it is mixed light of the violet light (light formed of blue color component light and red color component light) L1-1 and green color component light emitted from the green fluorescent substance 232.

It should be noted that red color component light of the violet light L1-1 is, when it enters the green fluorescent substance 232 in the transparent resin 234, absorbed in or reflected by the green fluorescent substance 232. Therefore, if the transparent beads 233 are not dispersed and mixed in the transparent resin 234 and only the green fluorescent substance 232 is dispersed and mixed therein, the amount of red color component light which passes through the transparent resin 234 is greatly decreased, and there may be cases where light which passes through the fluorescent film 230 does not become white light. On the other hand, according to this embodiment, because the transparent beads 233 are also dispersed and mixed in the transparent resin 234, part of red color component light passes through the transparent beads 233, and thus, transmittance of the red color component light is improved. In this way, the ratio of red color component light to the whole light which passes through the fluorescent film 230 can be prevented from being lowered, and, light which passes through the fluorescent film 230 becomes white light and the brightness of the white light L2 becomes higher.

Further, because the transparent beads 236 are dispersed and mixed in the transparent resin 237, the diffusion and dispersiblity of the white light L2 can be improved to attain uniform brightness.

It should be noted that the fluorescent film (whitening film) is not limited to the one illustrated in FIG. 3. If the film has at least a fluorescent substance dispersion layer in which a fluorescent substance is dispersed, and a color component light emitted from the fluorescent substance and color component light which enters the fluorescent film are mixed such that light which goes through and out of the fluorescent film becomes white light, other elements may be omitted.

With reference to FIG. 1 again, the white light L2 which passes through the fluorescent film (whitening film) 230 passes through two prism sheets 241 and 242 to improve its brightness, and illuminates the color liquid crystal display panel 110 from the side of its back surface.

A transflective plate 250 is disposed between the lower surface 212 of the light guide plate 210 and the auxiliary liquid crystal display panel 111. Further, two prism sheets 243 and 244 for improving the brightness are disposed between the liquid crystal display panel 111 and the transflective plate 250.

The transflective plate 250 has the function of reflecting part of the violet light L1-2 which enters the transflective plate 250 from the lower surface 212 of the light guide plate 210 and transmitting part of the rest of the light. Light reflected by the transflective plate 250 again enters the light guide plate 210, and after that, is emitted again from the upper surface 211 and the lower surface 212 of the light guide plate 210 as the light L1-1 and the light L1-2, respectively. Therefore, the transflective plate 250 contributes to improvement in the brightness of the main liquid crystal display panel 110 having a larger surface area. On the other hand, the violet light L1-2 which passes through the transflective plate 250 passes through the two prism sheets 243 and 244 to improve its brightness, and illuminates the monochrome liquid crystal display panel 111 from the side of its back surface.

As described in the above, according to Embodiment 1, the violet light L1 emitted from the light emitting diode 220 enters the side surface of the light guide plate 210, and is emitted as the violet lights L1-1 and L1-2 from the upper surface 211 and the lower surface 212 of the light guide plate 210, respectively. With regard to the violet light L1-1, green color component light is added thereto when the violet light L1-1 passes through the fluorescent film 230, and the violet light L1-1 becomes the white light L2 which illuminates the main color liquid crystal display panel 110 from the side of its back surface. The color liquid crystal display panel 110 can display optimum colors by being illuminated by white light as the backlight.

Meanwhile, the violet light L1-2 passes through the transflective plate 250 and illuminates the auxiliary monochrome liquid crystal display panel 111 from the side of its back surface. Here, the auxiliary liquid crystal display panel 111 performs monochrome display, but because the auxiliary liquid crystal display panel 111 is illuminated in violet by the violet light L1-2, the whole display surface of the auxiliary liquid crystal display panel 111 is in violet, the design is improved, and the appearance is enhanced. Specifically, even if the used liquid crystal display panel 111 is of the monochrome type which is inexpensive and low in power consumption, the auxiliary side can also perform color (chromatically colored) display. However, there is offered only a single color. Therefore, even if the liquid crystal display device is of the monochrome type, it can be designed such that, for example, the color of the outside of the display device 100 of the cellular phone is the same as the color which the auxiliary liquid crystal display device performs. In this way, in the double-sided display device according to the present invention, because the color liquid crystal display panel can be illuminated by white light as the backlight which is emitted from one surface of the double-sided illuminating device, the color liquid crystal display panel can perform optimum color display. Further, because the monochrome liquid crystal display panel can be illuminated by chromatically colored light as the backlight which is emitted from the other surface of the double-sided illuminating device, the monochrome liquid crystal display panel can perform chromatically colored display.

Embodiment 2

By further disposing a blue light cutting film between the transflective plate 250 and the auxiliary liquid crystal display panel 111 in Embodiment 1 illustrated in FIG. 1, the auxiliary liquid crystal display panel 111 can be illuminated by red light as the backlight, and thus, the auxiliary liquid crystal display panel can perform red display. Further, by disposing a red light cutting film between the transflective plate 250 and the auxiliary liquid crystal display panel 111, the auxiliary liquid crystal display panel 111 can be illuminated by blue light as the backlight, and thus, the auxiliary liquid crystal display panel 111 can perform blue display.

Still further, by disposing between the transflective plate 250 and the auxiliary liquid crystal display panel 111 a film having a layer where a fluorescent substance is dispersed or a film having a layer where a pigment is dispersed, the auxiliary liquid crystal display panel 111 can be illuminated by light in an arbitrary color (chromatically colored light) as the backlight, and the auxiliary liquid crystal display panel 111 can perform display in the arbitrary color.

Embodiment 3

In Embodiment 1, the LED element 222 emits blue light, the red fluorescent substance 223 added to the sealing resin 224 emits red light, and the fluorescent film (whitening film) 230 emits green light, so the light L2 which illuminates the main liquid crystal display 110 is made to be white light. However, the method to make light illuminating the light liquid crystal display panel to be white light is not limited to the above-mentioned example, and various combinations can offer white light. Here, various exemplary combinations for obtaining white light are described with reference to FIGS. 6 and 7, in which like parts as those illustrated in FIG. 1 are denoted by the same reference numerals and a detailed description thereof is omitted.

Figure 6:
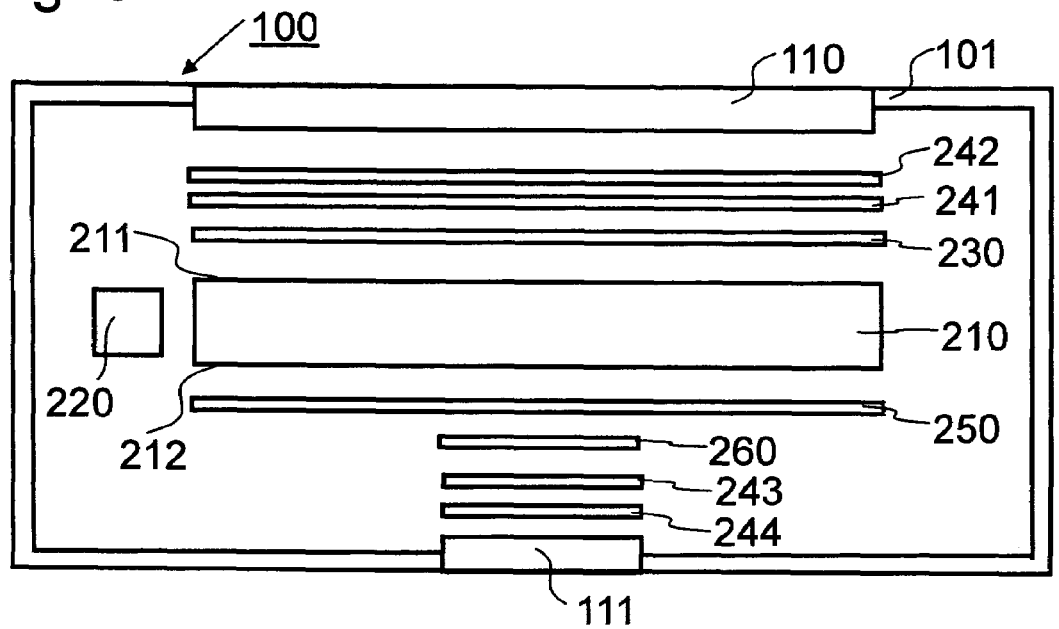
FIG. 6 is a sectional view of another example of a display portion of a cellular phone according to the present invention.

(1) In a first example illustrated in FIG. 6, a light emitting element which emits blue light is used. No fluorescent substance is added to the sealing resin. A fluorescent substance for emitting yellow light is dispersed and mixed in the whitening film. This makes it possible to illuminate the main liquid crystal display panel by white light. In this case, the auxiliary liquid crystal display panel is illuminated by blue light. In accordance with this example, by providing a colored filter 260 having an arbitrary color (a filter having a layer in which a pigment or a fluorescent substance is dispersed) or a specific color light cutting filter upstream of the auxiliary liquid crystal display panel, the auxiliary liquid crystal display panel can be illuminated by light of a color added by the colored filter or by light with a specific color component thereof being cut by the particular color light cutting filter.

Figure 7:
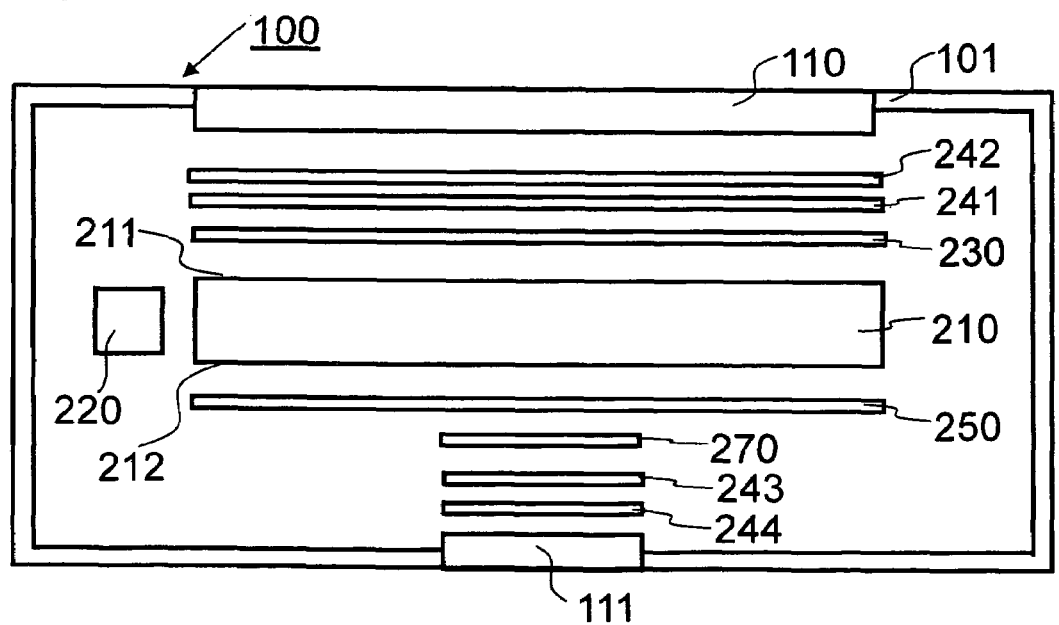
FIG. 7 is a sectional view of a further example of a display portion of a cellular phone according to the present invention.

(2) In a second example illustrated in FIG. 7, a light emitting element white emits blue light is used. No fluorescent substance is added to the sealing resin. A fluorescent substance for emitting red light and a fluorescent substance for emitting green light are dispersed and mixed in the whitening film. This makes it possible to illuminate the main liquid crystal display panel by white light. In this case, the auxiliary liquid crystal display panel is illuminated by blue light. In this example, by providing a color filter 270 having an arbitrary color or a specific color light cutting filter upstream of the auxiliary liquid crystal display panel, the auxiliary liquid crystal display panel can be illuminated by light having a color added by the colored filter or by light with a specific color component thereof being cut by the specific color light cutting filter.

(3) In a third example illustrated in FIG. 7, a light emitting element which emits blue light is used. A fluorescent substance for emitting green light is added to the sealing resin. A fluorescent substance for emitting red light is dispersed and mixed in the whitening film. This makes it possible to illuminate the main liquid crystal display panel by white light. In this case, the auxiliary liquid crystal display panel can be illuminated by blue-green light. In this example, by providing a specific color light cutting filter 270 upstream of the auxiliary liquid crystal display panel, the auxiliary liquid crystal display panel can be illuminated by light with a specific color component thereof being cut by the particular color light cutting filter. For example, by using a film which cuts blue light, the auxiliary liquid crystal display panel can be illuminated by green light, and, by using a film which cuts green light, the auxiliary liquid crystal display panel can be illuminated by blue light.

The above-mentioned items (1) to (3) are only examples, and the combination may take various kinds. Further, the light emitting element is not limited to a light emitting element which emits blue light, and a light emitting element which emits near-ultraviolet light can also be used. An important point is that light emitted from the light emitting element is light including a wavelength which can excite the fluorescent substance.

FIG. 4 illustrates exemplary combinations of a light emitting element (LED element) and a fluorescent substance added to a sealing material. By employing such combinations, various colors of light can be emitted from the light source as a whole.

The double-sided illuminating device and the double-sided display device according to the present invention can be used in, for example, a folder type cellular phone. Specifically, the double-sided illuminating device and the double-sided display device can be used in a display device of various kinds of electronic device such as a personal digital assistant in which a main color liquid crystal display panel and an auxiliary monochrome liquid crystal display panel are disposed back to back.

What is claimed is:

1. A display device, comprising:
 a first display portion that has a color filter;
 a second display portion;
 a light source having a light-emitting element that emits light including a wavelength which excites a fluorescent substance, and a transparent resin mixed with the fluorescent substance for emitting a first light having a different wavelength component when excited by light emitted by the light-emitting element;
 a light guide plate having an incidence surface through which the first light from the light source enters, a first light-emitting surface for illuminating the first display portion, and a second light-emitting surface for illuminating the second display portion; and
 light conversion means provided between the first display portion and the first light-emitting surface for converting the first light to a second light that has a color component different from a color component of the first light,
 wherein the first display portion is illuminated by white light obtained by mixing the first light and the second light to perform a color display and the second display portion is illuminated by the first light to perform a monochromatic color display.

2. A display device according to claim 1; further comprising one of a filter having a layer in which one of a pigment and a fluorescent substance is dispersed, and a particular color light cutting filter for cutting a particular color component among color components of the first light emitted from the light source, which is provided between the second light-emitting surface and the second display portion.

3. A display device according to claim 1; wherein the first and second display portions comprise liquid crystal displays.

4. A display device according to claim 3; wherein the light conversion means comprises a color fluorescent substance which is excited by the first light from the light source to generate the second light having a color component different from a color component of light from the light source and which generates white light by mixing the first light emitted from the light source with the second light having the color component different from the color component of the first light.

5. A display device according to claim 1; wherein the first display portion and the second display portion are disposed so as to face each other with the light guide plate disposed therebetween.

6. A display device comprising:
 a first display that, when illuminated with white light, exhibits a color display;
 a second display that, when illuminated with light, exhibits a monochromatic color display;
 a light source that emits a first light having a first color component;
 a light guide plate having an incidence surface on which the first light is incident, a first surface from which first light exits the light guide plate, and a second surface from which first light exits the light guide plate and illuminates the second display so that the second display exhibits a monochromatic color display;
 a light conversion element disposed between the first display and the first surface of the light guide plate and that converts first light exiting from the first surface to white light that illuminates the first display so that the first display exhibits a color display; and
 a color filter disposed between the second display and the second surface of the light guide plate and that has a layer in which is dispersed a pigment or a fluorescent substance,
 wherein the second display exhibits a monochromatic color display in a color different from the first color component of the first light.

7. A display device according to claim 6; further including a transflective plate disposed between the second display and the second surface of the light guide plate.

8. A display device according to claim 6; wherein the first and second displays are disposed in opposed relationship on opposite sides of the light guide plate.

9. A display device comprising:
 a first display that, when illuminated with white light, exhibits a color display;
 a second display that, when illuminated with light, exhibits a monochromatic color display;
 a light source that emits a first light having a first color component;
 a light guide plate having an incidence surface on which the first light is incident, a first surface from which first light exits the light guide plate, and a second surface from which first light exits the light guide plate and illuminates the second display so that the second display exhibits a monochromatic color display;

a light conversion element disposed between the first display and the first surface of the light guide plate and that converts first light exiting from the first surface to white light that illuminates the first display so that the first display exhibits a color display; and a light cutting filter disposed between the second display and the second surface of the light guide plate and that cuts a particular color component among color components of first light exiting the second surface, wherein the second display exhibits a monochromatic color display in a color different from the first color component of the first light.

10. A display device comprising:

a first display that, when illuminated with white light, exhibits a color display;

a second display that, when illuminated with light, exhibits a monochromatic color display;

a light source that emits a first light having a first color component, the light source comprising a light-emitting element that emits light, and a fluorescent substance that when excited by the light emitted from the light-emitting element generates the first light;

a light guide plate having an incidence surface on which the first light is incident, a first surface from which first light exits the light guide plate, and a second surface from which first light exits the light guide plate and illuminates the second display so that the second display exhibits a monochromatic color display; and a light conversion element disposed between the first display and the first surface of the light guide plate and that converts first light exiting from the first surface to white light that illuminates the first display so that the first display exhibits a color display, the light conversion element comprising a color fluorescent substance that, when excited by the first light, generates a second light having a second color component different from the first color component and that mixes the first light with the second light to generate white light.

11. A display device according to claim 10; wherein the light conversion element comprises a fluorescent film in which is dispersed the color fluorescent substance.

12. A display device according to claim 10; further including a transflective plate disposed between the second display and the second surface of the light guide plate.

13. A display device according to claim 10; wherein the first and second displays comprise liquid crystal displays.

14. A display device according to claim 10; wherein the first and second displays are disposed in opposed relationship on opposite sides of the light guide plate.

15. A display device according to claim 14; wherein the display area of the first display is larger than the display area of the second display.

* * * * *